INVENTOR.

Masaho Takami

Wenderoth, Lind & Ponack,
Attorneys

Aug. 13, 1968 MASAHO TAKAMI 3,397,105

TAPE FUSING DEVICE

Filed March 30, 1966 8 Sheets-Sheet 2

INVENTOR.

Masaho Takami

Wenderoth, Lind & Ponack,
Attorneys

Aug. 13, 1968 MASAHO TAKAMI 3,397,105

TAPE FUSING DEVICE

Filed March 30, 1966 8 Sheets-Sheet 3

INVENTOR.

Masaho Takami

Wenderoth, Lind and Ponack,
Attorneys

INVENTOR.

Masaho Takami

Wenderoth, Lind and Ponack,
Attorneys

Aug. 13, 1968 MASAHO TAKAMI 3,397,105

TAPE FUSING DEVICE

Filed March 30, 1966 8 Sheets-Sheet 5

INVENTOR.

Masaho Takami

Wenderoth, Lind and Ponack, Attorneys

INVENTOR.

Masaho Takami

Wenderoth, Lind and Ponack
attys

INVENTOR.

Masaho Takami
Wenderoth, Lind and Ponack,
attorneys

Aug. 13, 1968 MASAHO TAKAMI 3,397,105

TAPE FUSING DEVICE

Filed March 30, 1966 8 Sheets-Sheet 8

INVENTOR.

, Masaho Takami

Wenderoth, Lind and Ponack, attorneys

3,397,105
TAPE FUSING DEVICE

Masaho Takami, 1–15 Aza Kitaura, Nishi Tomatsu, Amagasaki, Hyogo Prefecture, Japan Filed Mar. 30, 1966, Ser. No. 538,860
Claims priority, application Japan, Apr. 24, 1965, 40/24,628; Sept. 22, 1965, 40/58,284, 40/77,754
5 Claims. (Cl. 156—494)

This invention relates to a device to fuse the tape to be used for the compressing machine, which compresses the tape around the outside of the package by holding down one end, while tightening the end, of the packing tape made of thermoplastic resin, such as polypropylene, which is wound around the outside of the package.

Extreme difficulties are involved in the method of precisely overlapping both ends of the tape made of thermoplastic material and fuse them together, for the upper tape will melt too much if heat is applied by the heater from over the overlapping tape.

Therefore, a satisfactory result will be obtained if the contact faces of the upper and lower tapes are heated and moderately melted, and then the melting surfaces are quickly pressed together before they harden. It is, however, very difficult to conduct such operations by hand.

This invention makes it possible to complete the entire process of the above-mentioned operations automatically, i.e. the operation of cutting off the superfluous part of the upper tape which is placed on the lower one, the operation of inserting the fusing heater in between both tapes, the operation of heating the tapes by means of automatically applying an electric current to the heater immediately before the said heater is inserted in between the tapes, the operation of pressing both tapes together by withdrawing the heater when the contact faces of both tapes, having been heated to a moderate temperature, have reached such a melting condition as will be suitable for pressure adhesion.

Figure 1:
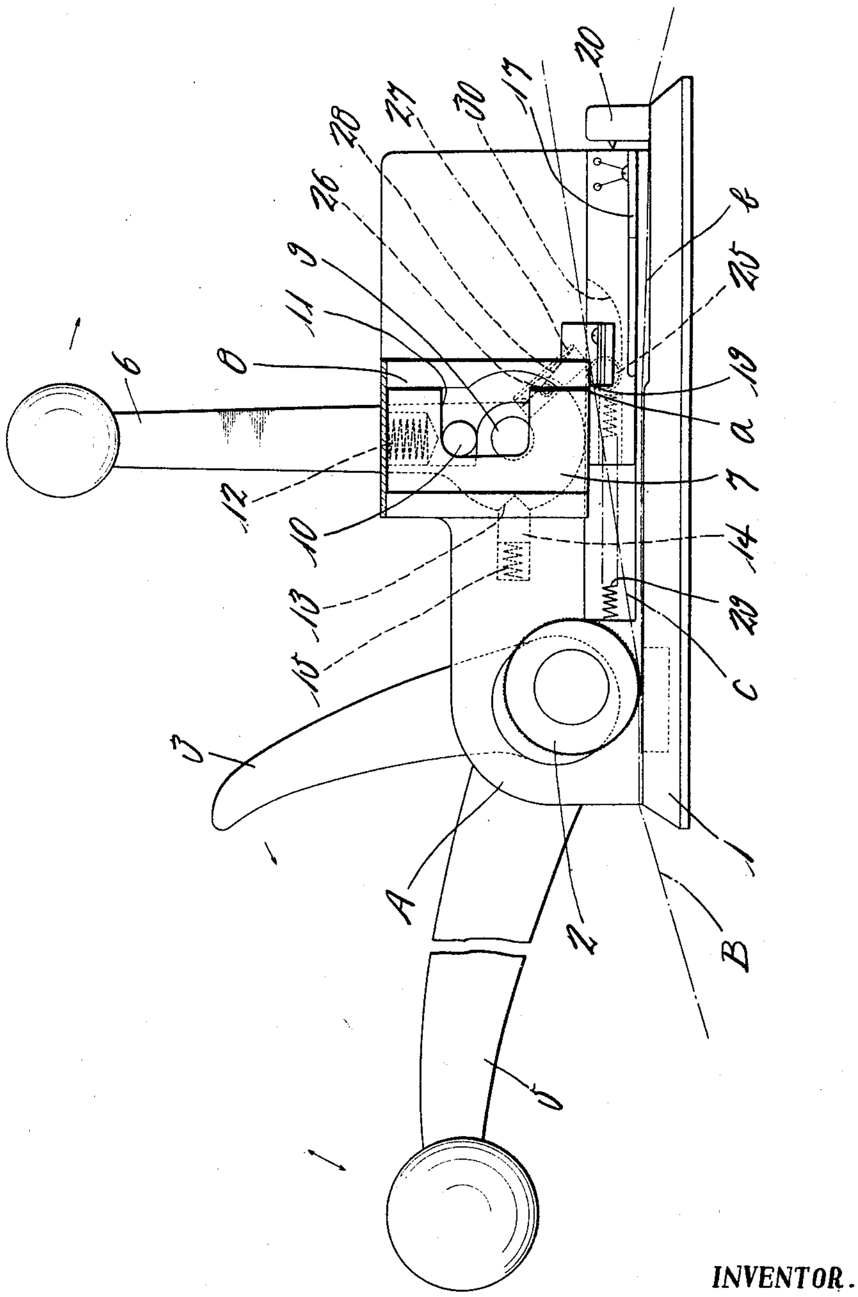
FIG. 1 is a front view of the packing tape compressing machine to which this invention has been applied, showing the state before the fusing operation is effected.

In FIGS. 1, 2, 3 and 4, 1 shows the base board of packing tape compressing machine, on the upper part of which are, as generally known, the reciprocating handle 3 for the feeding roll 2, the driving handle 5 for the feeding roll equipped with a ratchet wheel 4, and the operating handle 6 for the elevating body which serves as both the presser and the cutter of the tape.

The said elevating body 7 which is raised or lowered by the operating handle 6 moves along the guiding part 8 formed in the front part of the frame A, the said handle 6 being fixed to the frame A revolvably on a pivot at the part located behind the elevating body 7, the pin 10 fixed at the front of the boss of the handle 6 clicking in the click hollow 11 on the right side of the said elevating body 7.

The elevating body 7 is constantly pressed down by the spring 12, a V-shaped click hollow 13 being provided in a part of the periphery of the boss of the handle 6, a click pin 14 removably clicking in the said hollow 13 being provided on the frame A, the said pin 14 being pressed against the periphery of the boss of the handle by the spring 15, so that, when the handle is perpendicular, the pin 14 will click in the hollow 13, pushing up the upper side of the hollow 13, and raise the elevating body 7 to the uppermost position.

The said handle 6 is equipped with a spring 16 which gives it a revolving force to the right direction, but the elastic force of the said spring 16 is not so big as to dislocate the pin 14 from the hollow 13.

A sliding plate 17 which can slide right and left between the base board 1 and the elevating body 7 is provided at the front part of the frame A, to the left end of which is fixed a plate-shaped flat fusing heater folded double with a heat-proof insulating plate sandwiched in between, and to the front part of the frame A is fixed a upward blade-shaped heater 19 corresponding to the blade *a* at the lower righthand corner of the said elevating body 7.

At the right extremity of the base board 1 is provided a switch 20, which opens the circuit when pressed by the tip of the supporter 24 at the rear of the sliding plate 17 when the said sliding plate 17 moves to the right, the said switch 20 being inserted halfway in the circuit 22 leading to the primary coil of the transformer 21 on the base board 1, the said heaters being inserted in a series in the circuit 23 connected to the secondary coil of the transformer 21.

A press spring 29 is provided between the said supporter 24 and the frame A, pressing the sliding plate 17 to the right together with the supporter 24, a reciprocator 27 which is fixed on a pivot 26 at the right-hand lower part of the boss of the upright handle 6 contacting the right-hand upper part of the pin 25 provided in the hollow 30 formed in a part of the upper side of the supporter 24, the said reciprocator 27 being pivoted in such a way as can not revolve to the right against the boss any further than the position shown in FIG. 1 but can revolve in the left direction only, the said reciprocator 27 being equipped with a spring 28 supporting it anticlockwise.

The above-mentioned device functions as follows.

First, the device in the state of FIG. 1 is placed on the package and space is provided between the base board 1 and the roll 2 by turning the handle 3 to the left.

The right end of the tape wound around the package is brought to the base board 1 from the right side of the said base board 1, and securely pressed down onto the said base board 1, after having been passed under the sliding plate 17, by means of an appropriate hook (omitted from the figure), and the end of the tape extending further from the spot thus pressed down is placed under the elevating body 7.

The left-hand end *c* of the tape B is passed between the base board 1 and roll 2, and between the said end *b* on the base board 1 and the elevating body 7, and then pulled out to the right over the heater 19.

The roll 2 is lowered by turning the handle 3 to the right and then, while the end *c* is pressed down onto the base board 1 by the roll 2, the handle 50 is turned right and left, intermittently turning the roll 2 counter-clockwise and setting the ratchet wheel in motion, and thus the tape is compressed with its end *c* being slided rightward by means of the periphery of the roll.

When the tape B has been satisfactorily compressed, the click between the hollow 13 and the pin 14 can be released by tilting the handle 6 slightly to the right.

When the handle 6 is slightly tilted to the right, it is needless to mention that the pin 10, moving somewhat to the right, comes down a little and the elevating body which is pressing the upper side of the hollow 11 against the pin 10 also comes down slightly. Then, the blade *a* at the lower right corner of the elevating body 7 is placed on the end *c* of the tape B, while the said end C is placed on the upward blade-shaped heater 18, so that the elevating body 7 can not lower any further.

In this state, the handle 6 is receiving an anticlockwise revolving force from the spring 16, but the handle 6 is at a standstill sustaining a position slightly out of the perpendicular to the right, being arrested by the pin 14 pressing the periphery of the boss of the handle 6.

As mentioned above, when the handle is slightly tilted to the right, the reciprocator 27 provided on the boss of the handle 6 moves the pin 25 to the left by slightly turning together with the handle 6, causing the supporter 24 and the sliding plate 17 which are integrated therewith to slide slightly to the left, as a result of which the supporter 24 is separated from the switch 20, turning it off, so that the current is directed from the circuit to the primary coil, supplying a current to the secondary coil and the secondary circuit, and thus the heaters 18, 19 are heated.

The heater 19 being arranged across the reverse side of the end *c* of the tape B, when the said heater 19 is heated enough to melt the material, the end *c* is melted and cut across from below by the heater 19 as the end *c* of the tape B is pressed down onto the heater 19 by the elevating body 7.

Simultaneously with the cutting by melting, the elevating body 7 is sent further down by means of the elastic force of the spring 12, pressing down the end *c* to the left from the cut portion with the lower face of the elevating body 7, while the end *c* to the right from the cut portion remains on the right side of the heater 19.

As explained above, when the elevating body 7 is lowered, it presses down the pin 10 with the upper side of the hollow 11, so that the pin 10 a little to the right of the dead point revolves clockwise, overcoming the combined force of the downward pressure of the spring 12 and the revolving force of the spring 16, and the handle 6 falls violently to the right by means of inertia.

When the handle 6 falls to the right, the reciprocator 27 below also revolves clockwise, violently pressing the pin 25 to the left, as a result of which the supporter 24 and the sliding plate 17 which are integrated therewith slide to the left, causing the heater 18 at the left end thereof to slide in between the end *b* and the end *c* of the tape B.

When the heater 18 slides in between the two ends *b*, *c*, the said heater 18 is heated as the heater 19 to a temperature enough to melt the material while the end *c* is pressed down by the elevating body 7, as a result of which the ends *c*, *b* are pressed down onto the base board 1 with the heater 18 sandwiched in between, so that the lower face of the end *c* and the upper face of the end *b* are instantly melted by the heater 18.

Figure 2:
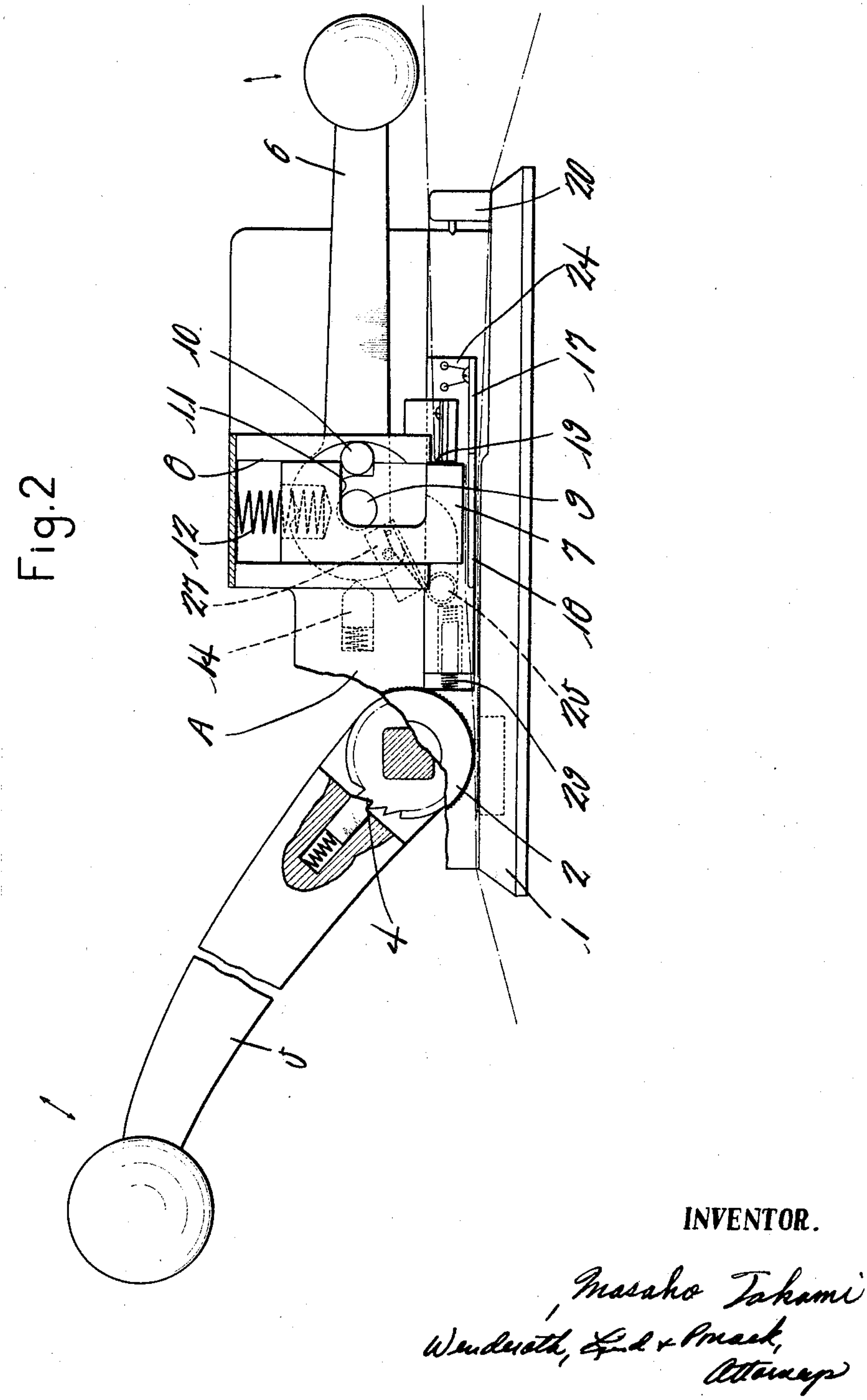
FIG. 2 is another front view of the said compressing machine, a part of which is sectioned longitudinally, showing the state of contact faces of the tapes being heated.
Figure 3:
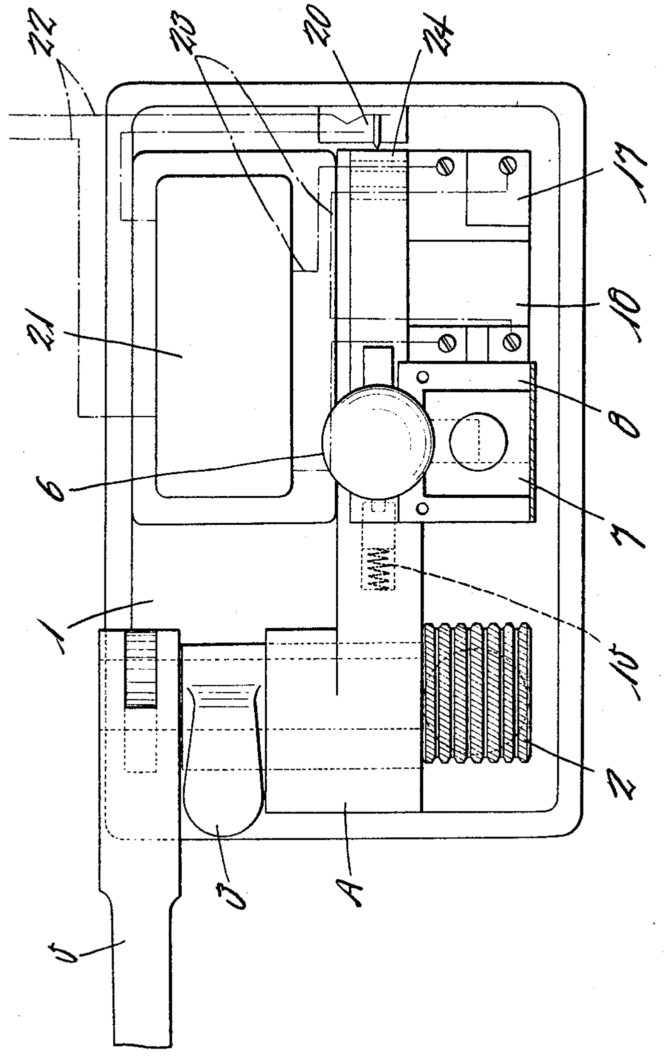
FIG. 3 is a surface view of the said compressing machine, a part of which is sectioned longitudinally, showing the state of FIG. 1 seen from above.
Figure 4:
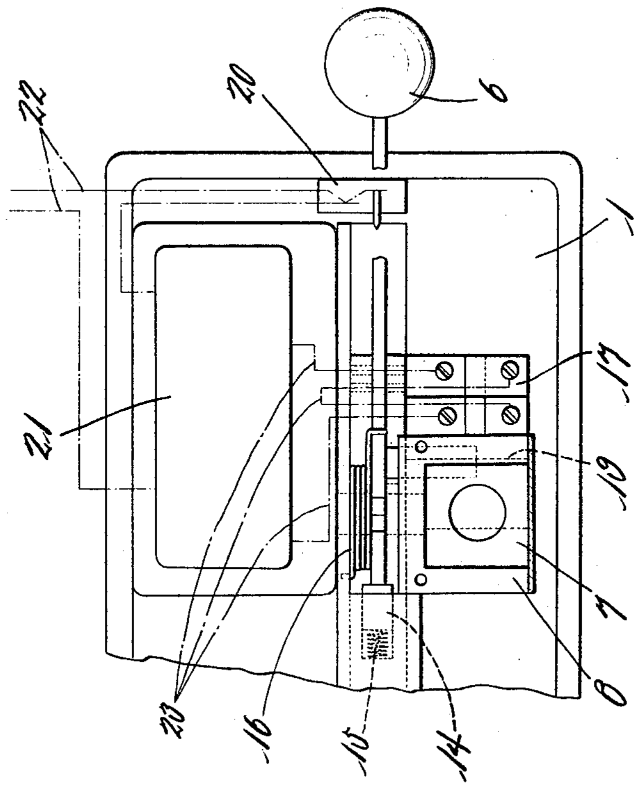
FIG. 4 shows the state of FIG. 2 seen from above, part of which is cut off and omitted.

The above-mentioned process is completed before the handle 6 falls to the right, and when the handle 6 has completely fallen to the right as shown by FIG. 2, the reciprocator 27 turning to the extreme left, comes off the pin 25, so that the sliding plate 17 quickly returns to the right owing to the elastic force of the spring 29, pulling out the heater 18 from between the ends *c*, *b*. At the same time, the right end of the supporter 24 presses the switch 20 off, turning off the primary current of the transformer 21 and consequently shutting off the current from the heaters 18, 19. In this state, the elevator 7 is completely lowered by the elastic force of the spring 12, pressing fully the ends *c*, *b* against the base board 1, so that the contact faces of the ends *c*, *d* which have been melted by the heater 18, are completely fused together.

Then, when the handle is turned counter-clockwise and returned to its original upright position, which is the state shown by FIG. 1, the elevating body 7 goes up, so that the device can be removed from the package after lifting the roll 2 by turning the handle 3 to the left.

When the handle 6 which has fallen to the right is returned to its original position, the reciprocator 27 has to travel over the pin 25, but this traveling over can be done with ease because the reciprocator 27 can revolve clockwise with the pivot 26 as its center. The handle 6 can thus regain its original position shown by FIG. 1.

Figure 6:
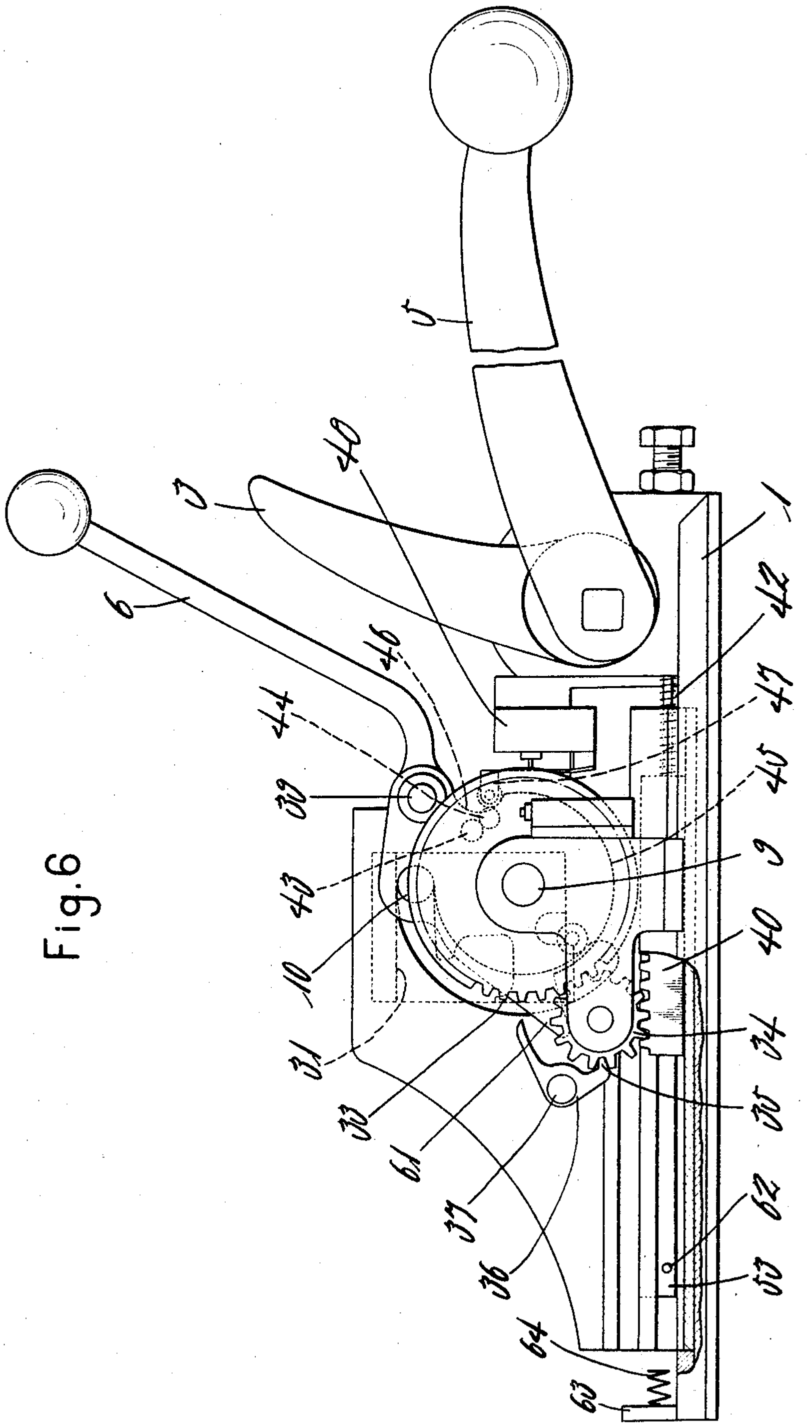
FIG. 6 is a back view of the said compressing machine illustrated by FIG. 5, part of which is sectioned longitudinally.
Figure 7:
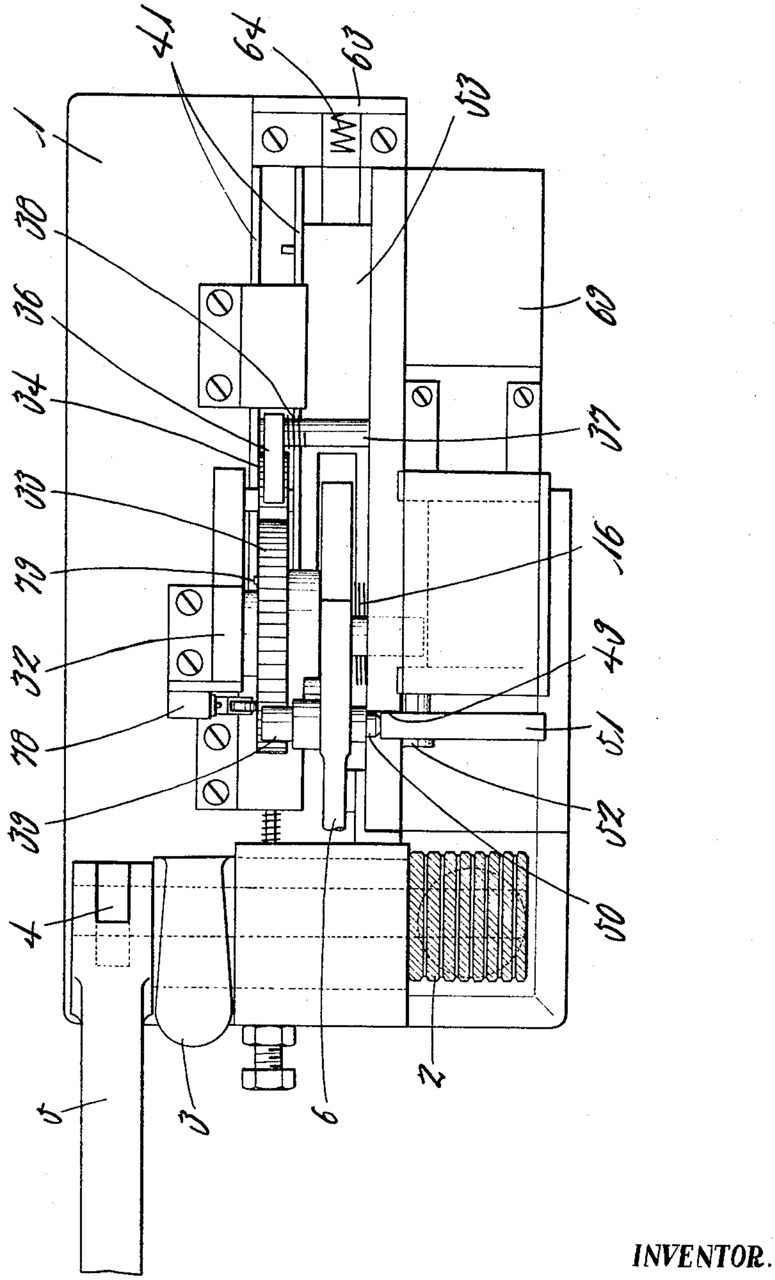
FIG. 7 is a ground plan of the said compressing machine illustrated by FIGS. 5 and 6.
Figure 8:
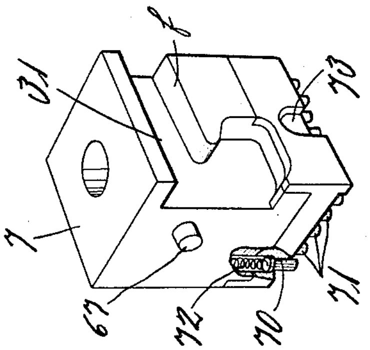
FIG. 8 is an oblique section of the elevating body serving as both the presser and cutter of the tape to be used for the said compressing machine illustrated by FIGS. 5, 6 and 7, part of which is cut off.

The following is the explanation of FIGS. 6, 7 and 8.

In this device too, the mechanism and function of the feeding roll 2, the handles 3, 5 with which to operate them and the ratchet wheel are identical with the case illustrated by FIGS. 1 to 4, so that detailed explanation concerning these parts will be omitted, while the identical marks will be employed.

In this device too, the elevating body with which to effect the cutting and pressing of the tape is mounted freely elevatably on the guiding part 8 of the frame A on the base board 1, pressed down by the spring 12 and raised or lowered by means of the handle 6 fixed on a shaft 9 at the back of the frame A. However, the relation between the handle 6 and the elevating body 7 is a little different.

As shown by FIG. 6, the pin 10 provided on the front side of the boss of the handle 6, being loosely fitted into the arc-shaped hole on the frame A, clicks with the hollow 31 formed on the back side of the elevating body 7 and the upper side of the hollow 31 is pushed up by the said pin 10.

The shaft 9 of the handle 6, extending backward, is supported by the bearing 32, the gear 33 being loosely fitted to the shaft 9 at the front part of the said bearing 32.

A small gear 34 is so pivoted on the bearing as will be located on the left, as shown by FIG. 6, and a crooked reciprocator 36 which has a pawl 35 at its lower end is fixed at its middle part to the back side of the frame A by means of a shaft 37, and the said reciprocator 36 is provided with a spring 38 which presses the pawl 35 against the small gear 34.

On the back side of the boss of the handle 6 is provided a pin 39 which, when the handle 6 is turned toward the smaller gear 34, releases the click between the pawl 35 and the small gear 34 by pressing down the upper end of the reciprocator 36.

A gear rod 40, which is located at the lower end of the small gear 34 and engages the said small gear 34, is fitted freely slidably on the guide rail 41, and the end of the said gear rod 40 on the side of the handle 5 is provided with a stabilizing spring 42 to be compressed by the gear rod 40 which moves toward the said direction.

The corresponding faces of the boss of the handle 6 and the gear 33 are respectively provided with protruding click pins 43, 44, which press the handle 6 and the handle 3 against each other, turning both of them, only when the handle 6 is turned toward the handle 3, an arc-shaped circular part 45 with the shaft 9 as its center being formed on the periphery of the boss to the necessary extent with a hollow 40 provided in a part thereof, the frame A being equipped with a microswitch 48 which opens the circuit only when the operator 47 is pressed down, the roller at the end of the said operator 47 being fixed in such a way as will fit into the hollow 46 and keep the switch 48 on only when the handle 6 is tilted toward the handle 3. Besides, the bearing 32 is provided with a switch 78, which is turned off when it is pushed by the projection 79 of the gear 33.

The boss of the handle 6 is provided with a click pin 50, which is projected by the action of the spring (omitted from the figure) and clicks with the clicking part 49 of the frame A when the handle 6 is tilted toward the handle 3, and a manual operator is eccentrically pivoted on the said clicking part 49 by means of a pin 52. The front part of the rail 41 is equipped with a reciprocating rod 53 running parallel with the said gear rod 40, a heatproof insulating plate, which is fixed to the right-hand front of the said reciprocating rod, being protruded from the rear part of the elevating body 7 through the space at the lower rear part of the frame A, the insulating plate 55 which is protruded to the left further than the front edge of the insulating plate 54 being of the identical breadth with that of the lower surface of the elevating body 7, the said insulating plate 55 being sandwiched in between the double-folded heater 56 of a thin Nichrome plate or the like, the said heater 56 being fixed to the insulating plate with the screws 57, 57.

The left-hand end of the reciprocating rod is formed into a fork 58 with a hollow 59 which becomes shallower toward the right from the middle, the end of the fork 58 being equipped with a roller 60, the handle 6 being provided at its lower end with a projection 61 with which to hook the said roller 60, a click pin 62 being provided at the right hand rear side of the reciprocating rod, which clicks with the right end of the gear rod 40, the projection 63 at the right-hand extremity of the base board 1 is provided with a bumper 64 with which to receive the reciprocating rod 53 when it moves to the right.

The elevating body 7 is equipped on its right side with a pressure plate 65 vertically slidable, a pin 67 on the right side of the elevating body 7 clicking freely slidably into the longitudinally oblong hole in the middle of the pressure plate 65, and is also equipped with a spring 68 with which to push down the pressure plate 65.

An upward blade-shaped heater 19 is provided on the left-hand extremity of the receptacle 69 which consists of a heat-resistant insulator fixed to the right-hand front of the frame A. The said heater 19 is positioned precisely under the left-hand end of the said pressure plate 65, and the blade *a* at the right-hand lower corner of the elevating body 7 is made to come down sliding on the left side of the said heater 19.

A plurality of holes 70 . . . are formed on the lower surface of the elevating body 7, the said holes being provided with a plurality of small projecting shafts 71 which can freely appear and disappear but never protrude any further than a certain predetermined length, and are constantly pressed downward with a spring 72, a notch 73 being formed at the rear lower part of the elevating body 7.

A sliding plate 75 having a click is fixed freely reciprocatably inside the lower part of the frame A, the said sliding plate 75 being constantly pressed to the right by a spring 76 and pushed forward beyond the mouth in the lower part of the frame A, namely, below the elevating body 7, the click 74 supporting the lower surface of the elevating body 7 when the sliding plate is in a retreated position, the said click 74 fitting in the notch 74 of the elevating body when the sliding plate 75 moves to the left, thus enabling the elevating body 7 to come down to the lowest position, a presser 77 being fixed to the base of the insulating plate 54 with which to push the right end of the sliding plate when it moves to the left.

The said switches 48, 78 are inserted halfway in the circuit leading to the primary coil of the transformer (omitted from the figure), while the heaters 19, 59 are inserted in a series in the circuit connected to the secondary coil of the transformer.

The above-mentioned equipment functions as follows.

The device is placed on the package, the end *b* of the right-hand extremity of the tape B is put on the base board 1 from the right side of the said base board 1 (as is clear from FIG. 5, the front of the base board 1 terminates at around the right-hand lower part of the elevating body 7), the roll is lifted by turning the handle 3 to the left, the left end *c* of the tape B is passed from the left side of the base board 1 up to the lower part of the roll and pulled out to the right over the right end *b* and below the elevating body 7. Then, the end *b* is fixed by means of an appropriate hook (omitted from the figure), and pressed down against the base board 1 by returning the handle 3 and lowering the roll 2.

By reciprocating the handle 5 right and left, the roll 2 is intermittently revolved counter-clockwise through the ratchet wheel, thereby pulling the end *c* of the tape B to the right and compressing the package.

Figure 5:
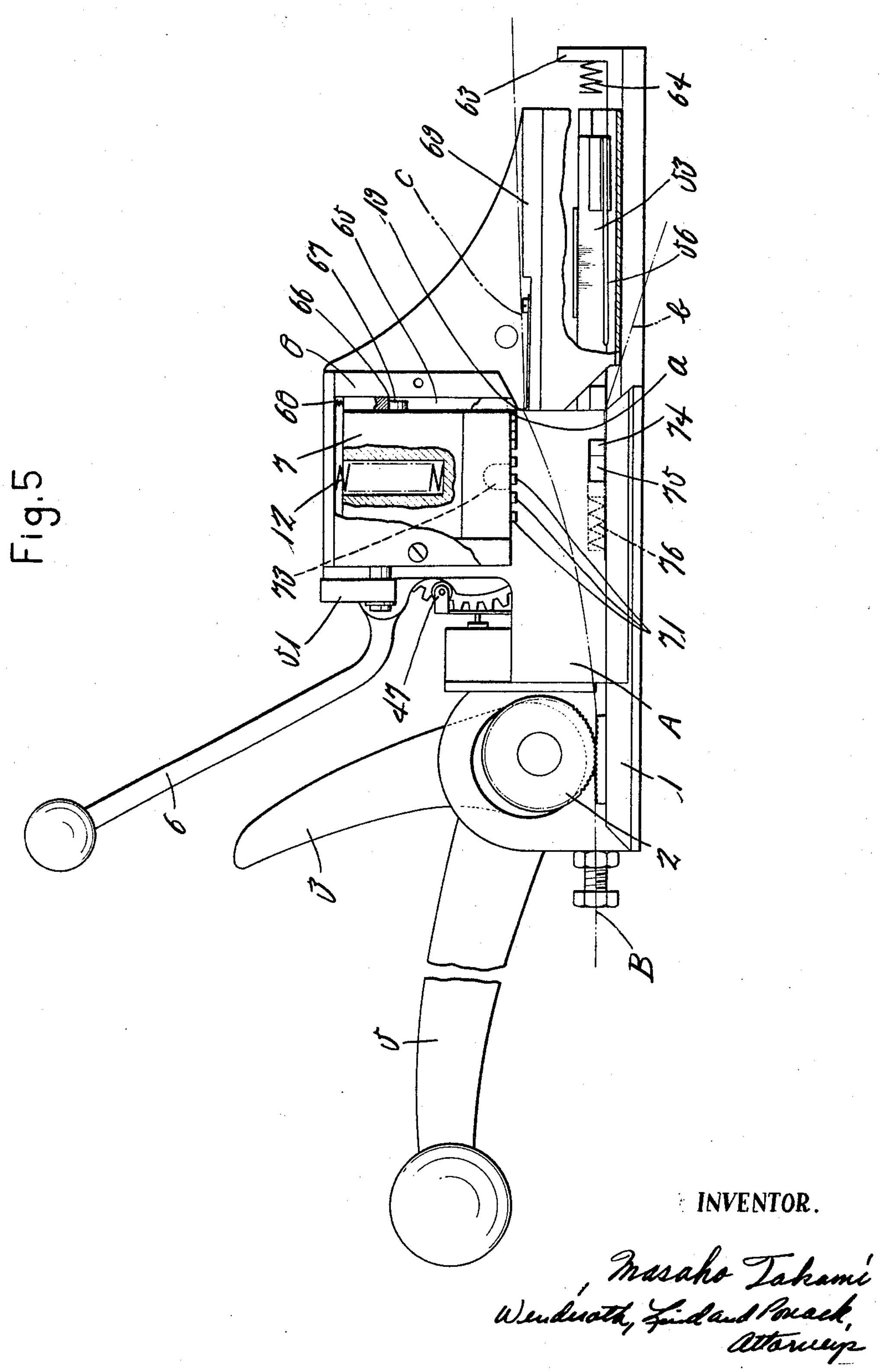
FIG. 5 is a front view of the packing tape compressing machine to which this invention has been applied, showing the state before the fusing operation is effected, part of which is sectioned longitudinally.

Now, the handle 6 is tilted to the left as shown by FIGS. 5 and 6, the pin 50 on the boss being clicked with the clicking part 49, the gear rod 40 being located on the right side (FIG. 2) and pressing the spring 32, the small gear 34 being arrested by the pawl 35, the operator 47 of the switch 48 being inserted in the hollow 48 of the boss of the handle 6, opening the circuit, the switch 78 being turned on.

In this state, when the pin 50 is pressed down by manually operating the operator 51 and released from the click with the clicking part 49, the handle 6 tries to revolve to the left (FIG. 6) under the pressure of the spring 16 and tries to lower the elevating body 7 by pressing down with its pin 10 the lower edge of the upper part of the hollow 31 of the elevating body 7, while the spring 12 also tries to lower the elevating body 7, but the elevating body 7 is unable to come down because the end *c* of the tape B is inserted between the elevating body 7 and the heater 19.

However, the handle 6, having already revolved a little, the operator 47, coming out of the hollow 46 is pressed by the periphery 45, as a result of which the switch is turned on and the current begins to flow into the heaters 19, 56, causing the temperature to rise.

Accordingly, after some time the end *c* is melted off by the heater 19, and the spring 12 sends the elevating body 7 down rapidly, while the handle 6 turns to the left rapidly (FIG. 6) at the same time.

As a result, the projection 61 hooks the roller 60 and moves the reciprocating rod 53 to the left rapidly (FIG. 5), causing the heater 56 integrated therewith to protrude below the elevating body 7.

When the elevating body 7 comes down, its descent is temporarily arrested by the click 74, and while there still remains enough space between the elevating body 7 and the base board 1, the heater 56 protrudes under the elevating body 7. And when the handle 6 turns further and the heater 56 protrudes further, the presser 77 presses the right-hand end of the sliding plate 75, inserting the click 74 into the notch 73, so that the elevating body 7, having lost the support of the click 74, presses down the end *c* of the tape B against the heater 56. Now the heater 56, pressed down by the end *c*, is sandwiched in between the ends *c*, *b*, fusing the contact faces of the said ends *c*, *b*.

When the handle 6 turns still further, the projection 61 comes off the roller 60, and then the pin 39 turns the reciprocator 36 by pressing down the upper end thereof, releasing the small gear 34 from the pawl 35. Immediately the small gear 34 is set free, the spring 42 sends back the gear rod 40 to the left with rapidity, simultaneously restoring the reciprocating rod 53 to its original position by pressing the pin 62, (pulling off the heater 56 integrated therewith from between the ends *c*, *b*, as a result of which the ends *b*, *c* are pressed down by the elevating body 7 and the melted contact faces are fused together.

When the handle 6 falls, the heater 56 is drawn out from between the ends *b*, *c*, and the fusing is completed, the projection 79 on the side of the gear 33 turns off the micro-switch 78, cutting off the current to the heaters 19, 56.

When the handle 6 is returned to the position shown by FIGS. 5 and 6, all the other parts are restored to the original state, namely, as shown by FIGS. 5 and 6. Then, the roll 2 is lifted by operating the handle 3, the fused tape B is taken of the base board 1 and the device is put away from the package.

Figure 9:
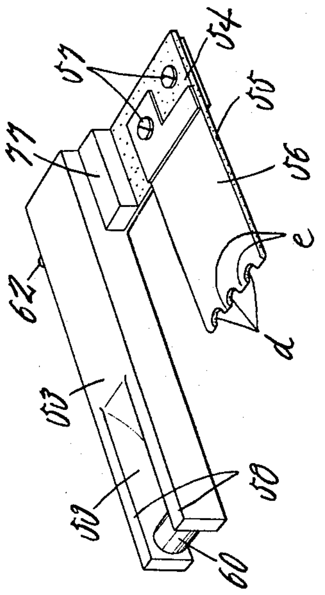
FIG. 9 is an oblique section of the heater to be used for the said compressing machine illustrated by FIGS. 5, 6 and 7.

If the fold of the heater 56 is provided with a plurality of holes so that notches *d* will be formed when bent (FIG. 9), the heater 56, being connected by the narrow parts 4 only at this portion, acquires a particularly high temperature, making the fusion quite perfect.

Moreover, the end *c* is pressed down by a large number of projections 71, so that uniform pressure is given all over even when the pressed surface is more or less irregular, and thus perfect fusion can be obtained.

Besides, in this invention, the heater 18 or 56 to be inserted in between the ends *b*, *c* of the tape B proceeding forward or backward along the length of the tape, there is no risk of the tape B slipping out of position during the process of fusion, so that tape of an extremely narrow width can also be fused with precision. Furthermore, simultaneously with the cutting of the end of the tape by the heater 19, the fusing heater is inserted in between the ends of the tape, making the melting temperature of the contact face constantly uniform, so that the fusion is free from irregularity.

I claim:

1. A tape fusing device for the packing tape compressing machine consisting of an upward blade-shaped cutting heater to support the lower surface of the end of the tape placed thereupon, an elevating body to cut off the tape placed on the said heater by pressing it down taking advantage of the elastic force of a spring, a handle reciprocating in connection with the rising or falling movement of the said elevating body, and a fusing heater which, simultaneously with the descent of the elevating body cutting off the end of the tape, proceeds between the two overlapping ends of the tapes and retreat after melting both the upper and lower opposite faces of the ends of the tape.

2. A tape fusing device for the packing tape compressing machine as stated in claim 1, in which a switch is provided halfway in the electric circuit to the heater in such a way that both the upturned blade-shaped cutting heater and the fusing heater will be heated and cooled simultaneously, that is, a switch to function in such a way as will cause each heater to generate heat at the start of the fusing process and cool with completion of the said process.

3. A tape fusing device for the packing tape compressing machine as stated in claim 1, in which the lower surface of the elevating body is provided with a number of small projecting shafts which can freely appear and disappear, a spring constantly supporting the said projections in such a way as will allow them to appear and disappear in the downward direction.

4. A tape fusing device for the packing tape compressing machine as stated in claim 1, in which the fusing heater proceeds between the ends of the tape while there still remains enough space between the elevating body and the base board, when the said elevating body comes down cutting off the end of the tape and is arrested by the click, the click coming off the elevating body after that, the said elevating body coming further down, pressing the end of the tape against the fusing heater.

5. A tape fusing device for the packing tape compressing machine as stated in claim 1, in which the fusing heater is folded double with a heat-proof insulating plate sandwiched in between, the fold of the said heater being provided with a plurality of notches with the aim of particularly hightening the temperature at the end of the fusing heater by decreasing the traverse space of the said portion of the heater.

References Cited

UNITED STATES PATENTS

| | | | |
|---|---|---|---|
| 2,527,330 | 10/1950 | Prohaska | 53—198 |
| 2,817,937 | 12/1957 | McNamara et al. | 53—198 |
| 2,982,069 | 5/1961 | England | 156—494 |
| 3,200,028 | 8/1965 | Chisholm | 156—499 |

DOUGLAS J. DRUMMOND, *Primary Examiner.*